(12) United States Patent
Karode et al.

(10) Patent No.: US 9,579,606 B2
(45) Date of Patent: Feb. 28, 2017

(54) GAS SEPARATION MEMBRANE MODULE WITH IMPROVED GAS SEAL

(71) Applicant: Air Liquide Advanced Technologies U.S. LLC, Houston, TX (US)

(72) Inventors: Sandeep K. Karode, Boothwyn, PA (US); Karl S. Beers, Upper Darby, PA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 300 days.

(21) Appl. No.: 14/338,913

(22) Filed: Jul. 23, 2014

(65) Prior Publication Data
US 2016/0023164 A1   Jan. 28, 2016

(51) Int. Cl.
*B01D 53/22* (2006.01)
*B01D 65/00* (2006.01)
*B01D 63/04* (2006.01)

(52) U.S. Cl.
CPC ........... *B01D 65/003* (2013.01); *B01D 53/22* (2013.01); *B01D 63/043* (2013.01); *B01D 53/226* (2013.01); *B01D 2053/224* (2013.01); *B01D 2256/245* (2013.01); *B01D 2257/504* (2013.01); *B01D 2313/04* (2013.01); *B01D 2313/105* (2013.01); *B01D 2313/125* (2013.01); *B01D 2313/13* (2013.01); *B01D 2319/022* (2013.01); *B01D 2319/04* (2013.01)

(58) Field of Classification Search
CPC ................ B01D 53/226; B01D 63/043; B01D 2313/125; B01D 2319/022; B01D 2053/224; B01D 2256/245; B01D 2257/504; B01D 2313/04; B01D 2313/105; B01D 2313/13; B01D 2319/04; B01D 53/22; B01D 65/003
See application file for complete search history.

(56) References Cited

U.S. PATENT DOCUMENTS

| 3,422,008 A | * | 1/1969 | McLain | B01D 53/22 210/321.74 |
| 3,503,515 A | * | 3/1970 | Tomsic | B01D 29/00 210/321.88 |
| 4,016,078 A | * | 4/1977 | Clark | B01D 63/06 210/321.9 |
| 4,080,296 A | * | 3/1978 | Clark | B01D 63/024 210/321.87 |
| 4,105,562 A | * | 8/1978 | Kaplan | B01D 29/15 210/232 |

(Continued)

FOREIGN PATENT DOCUMENTS

| EP | 0 487 831 | 6/1992 |
| WO | WO 2006 062791 | 6/2006 |

OTHER PUBLICATIONS

Search Report for EP 15 17 7914, mailed Dec. 8, 2015, 7 pgs.

*Primary Examiner* — Anthony Shumate
(74) *Attorney, Agent, or Firm* — Christopher J. Cronin

(57) ABSTRACT

Parallel membrane elements are arranged in parallel within a pressure vessel. A sealing body is disposed within the pressure vessel and is compressed against an inner surface of the pressure vessel to provide a leak-right seal in between a feed gas side of the sealing body and a non-permeate side of the sealing body. The sealing body may be slid within the pressure vessel without damaging the sealing body and in all cases without requiring mechanical assistance.

12 Claims, 12 Drawing Sheets

(56) References Cited

U.S. PATENT DOCUMENTS

| | | | | |
|---|---|---|---|---|
| 4,352,736 A | * | 10/1982 | Ukai | B01D 53/22 210/321.88 |
| 4,480,683 A | * | 11/1984 | Wollbeck | B01D 53/22 165/180 |
| 4,670,145 A | | 6/1987 | Edwards | |
| 4,876,006 A | * | 10/1989 | Ohkubo | B01D 63/02 210/321.69 |
| 4,959,152 A | * | 9/1990 | Nichols | B01D 63/02 210/232 |
| 5,041,220 A | * | 8/1991 | Lee | B01D 63/024 210/321.8 |
| 5,071,552 A | * | 12/1991 | Bikson | B01D 63/043 210/321.8 |
| 5,470,469 A | * | 11/1995 | Eckman | B01D 63/02 210/321.78 |
| 5,645,626 A | * | 7/1997 | Edlund | B01D 53/22 95/56 |
| 5,851,267 A | | 12/1998 | Schwartz | |
| 6,632,356 B2 | * | 10/2003 | Hallan | B01D 63/106 210/321.6 |
| 7,338,601 B2 | | 3/2008 | Schott et al. | |
| 7,790,030 B2 | | 9/2010 | Schwartz et al. | |
| 8,034,241 B2 | * | 10/2011 | Beppu | B01D 63/106 210/200 |
| 8,540,876 B2 | | 9/2013 | Poklop et al. | |
| 2011/0024342 A1 | * | 2/2011 | Fujita | B01D 63/065 210/184 |
| 2011/0174713 A1 | * | 7/2011 | Shelby | B01D 63/043 210/232 |
| 2014/0008284 A1 | | 1/2014 | Poklop et al. | |
| 2014/0283683 A1 | * | 9/2014 | Oguro | B01D 63/06 95/45 |
| 2014/0318372 A1 | * | 10/2014 | Butterfield | B01D 71/028 96/8 |

* cited by examiner

GAS SEPARATION MEMBRANE MODULE WITH IMPROVED GAS SEAL

CROSS-REFERENCE TO RELATED APPLICATIONS

None.

BACKGROUND

Field of the Invention

The present invention relates to gas separation membranes.

Related Art

Membranes are commonly used for large scale fluid (water or gas) separation processes. Gas separation membranes are commonly manufactured in one of two configurations: flat sheet or hollow fiber. The flat sheets are typically combined into a spiral wound element. On the other hand, the hollow fibers are commonly bundled together in a manner similar to a shell and tube heat exchange or they are wrapped around a mandrel.

In typical spiral wound flat sheet membranes, two flat sheets of membrane with a permeate spacer in between are joined, for example glued, along three of their sides to form an envelope (i.e., a "leaf") that is closed on three sides but open on one side. These envelopes are separated by feed spacers and wrapped around or otherwise to form a perforated permeate tube with the open side of the envelope facing the permeate tube. Feed gas enters along one side (i.e., the feed gas side) of the wound membrane element in between two adjacent envelopes and passes through the membrane element in an axial direction. As the gas travels between adjacent envelopes, more permeable fluids permeate through one of the sheets and into an interior of the envelope. These permeated gases have only one available outlet (the single open side of the envelope), so they travel within the envelope in an inwardly spiraling path, out the open envelope side, and to the permeate tube. The primary driving force for such transport (from the feed side to the permeate tube) is the pressure differential between the high feed gas pressure and the low permeate gas pressure. The permeate gas enters the permeate tube, such as through perforations formed in the tube. The gases that do not permeate the sheet are referred to as the non-permeate gas (or residue or retentate). The non-permeate completes travel through the spiral wound sheet in the axial direction and exits the side of the membrane element opposite that of the feed gas side.

In hollow fiber elements, very small hollow fibers are laid around a central tube either arranged parallel to the axis of the tube or helically wrapped around the tube. This achieves a fairly high packing density. In one type of hollow fiber membrane, the bores of the fibers at one end thereof are sealed off from the feed gas with a tubesheet at one end of the membrane element. In another type of hollow fiber membrane, the bores of the fibers at each end thereof are sealed off from the feed gas with a tubesheet at each end of the membrane element. Feed gas is fed to the outer circumferential surface of the membrane element and flows over and between the fibers. More permeable gases permeate across the fiber wall into the fiber bores. The permeate gas then travels within the fiber and is collected at the tubesheet (s). When two or more membrane elements are arranged in parallel, the permeate gas from one membrane element is mixed with the permeate gases from the other membrane elements. Typically, the combined permeate gas exits the membrane element through a permeate conduit or pipe. Gases not permeating through the fiber wall eventually reach a central tube of the membrane element, which is typically perforated. While many configurations for the permeate conduit have been proposed, in one such configuration, the central tube is divided into two regions extending throughout the entirety of the central tube. In such a divided region tube, the non-permeate gas is conveyed in the outer region while the permeate gas is conveyed in the inner region. The inner region is sealed off from the outer region but fluidly communicates with a permeate gas collection element formed in the tubesheet.

Some have proposed to arrange multiple spiral wound membrane elements in series within a single pressure vessel, such as U.S. Pat. No. 5,851,267 and U.S. Pat. No. 7,338,601. Gases on the feed side that do not permeate through the flat sheet leave through the non-permeate side of the membrane element opposite the feed gas side. The non-permeate gas from the first membrane element in the pressure vessel constitutes the feed gas for the second membrane element, the non-permeate gas from second membrane element constitutes the feed gas for the third membrane element, and so on. The permeate tubes of each of the membrane elements are aligned to form a single tube that sequentially receives permeate gas from each the membrane elements in the pressure vessel. In these types of membrane modules, in order to maintain the integrity of the of the feed, permeate, and non-permeate gases. Generally speaking, these types of membrane modules have utilized a seal disposed between the feed gas inlet/port and the membrane elements in order to prevent feed gas from leaking into the annular space in between the outer surface of the membrane element and the inner surface of the pressure vessel.

In particular, U.S. Pat. No. 5,851,267 discloses a single seal at the feed end of the pressure vessel and other seals at each membrane-to-membrane element pairing. At the feed end, a ring-shaped flange is attached to the first upstream membrane element (upstream in the context of the direction of the flow of the feed) and the annular space in between the flange and the inner wall of the pressure is sealed with a seal such as an O-ring. Because this single seal is only provided to the first upstream membrane element after all of the membrane elements have been sequentially loaded into the pressure vessel, this single seal does not have to exhibit such a low resistance to sliding that it can be slid down the length of the pressure vessel. The remaining seals in between adjacent membrane elements also do not have to exhibit such a low resistance to sliding that it can be slid down the length of the pressure vessel. This is because each the O-rings in a membrane-to-membrane seals only needs to be slid a very small distance to allow one half of the seal attached to one membrane unit to engage with the other half of the seal attached to the other membrane in the membrane pairing. The O-ring is then secured into place by twisting one of the seal halves with respect to the other seal half until it is locked.

The in-series membrane element arrangement disclosed by U.S. Pat. No. 5,851,267 has some drawbacks. For example, performance of the downstream membrane elements degrades more quickly than that of the upstream membrane elements (upstream and downstream again in the context of the flow direction of the non-permeate). This leads to inefficient operation. Also, the series configuration results in a greater pressure drop from the feed to residue (also known as retentate or non-permeate).

Therefore, it is an object of the invention to provide a membrane module including multiple membrane elements that does not suffer from the above-described drawbacks.

Instead of membrane elements in series, U.S. Pat. No. 4,670,145 discloses a membrane module including several membrane elements in a same pressure vessel that are arranged in parallel instead of in series. In other words, each membrane element receives the feed gas instead of the non-permeate gas from the adjacent, upstream membrane element (upstream in the context of the direction of the flow of feed gas). While the solution proposed by U.S. Pat. No. 4,670,145 is generally satisfactory, it requires access to each end of the pressure vessel.

Therefore, it is another object of the invention to provide a membrane module including multiple membrane elements arranged in parallel that does not require access to each end of the pressure vessel.

U.S. Pat. No. 7,338,601 discloses a membrane module including several membrane elements arranged in series, including one embodiment in which the non-permeate is withdrawn from a middle of the pressure vessel and a seal is provided at each end of the pressure vessel that seals the feed gas from the permeate. Similar to U.S. Pat. No. 5,851,267, the membrane arrangement disclosed by U.S. Pat. No. 7,338,601 also exhibits faster performance degradation of the downstream membrane elements in comparison to the upstream membrane elements (in the context of the direction of the flow of feed gas), leading to inefficient operation. It also results in a greater pressure drop from the feed to residue (also known as retentate or non-permeate).

Therefore it is another object of the invention to provide a membrane module having a non-permeate withdrawal port in the middle of the pressure vessel and membrane elements arranged in parallel instead of in series.

SUMMARY

There is disclosed gas separation membrane module comprising: a tubular pressure vessel having at least one feed gas inlet, at least one permeate gas outlet, and a non-permeate gas outlet; a plurality of membrane elements arranged in parallel within the pressure vessel, each of the membrane elements comprising a plurality of hollow fibers, an outer tube extending through the membrane elements that is substantially coaxial with an axis of the pressure vessel, and an inner tube that extends through an interior of the outer tube coaxial with or parallel to the axis of the pressure vessel; a permeate collection conduit fluidly communicating between the open end of the single, integrated inner tube and the permeate outlet; and at least one sealing body that is disposed around the outer tube at a downstream-most one of the plurality of spaced membrane elements. Each of the plurality of outer tubes is connected to one another to form a single, integrated outer tube. Each of the plurality of inner tubes is connected to one another to form a single, integrated inner tube. An annular space is defined by the inner surface of the single, integrated outer tube and an outer surface of the single, integrated inner tube. The single, integrated inner tube receives non-permeate gas flowing between the hollow fibers via perforations formed in the plurality of outer tubes. The annular space has a first end that is sealed and a second end that is open. Each of the inner tubes fluidly communicates with bores of the fibers of an associated one of the plurality of membrane elements. The single, integrated inner tube has a first end that is open and which is adjacent the first sealed end of the annular space. The single, integrated inner tube also has a second end that is sealed and which is adjacent the second open end of the annular space. The sealing body is disposed at a position within the pressure vessel in between the downstream-most membrane element and the non-permeate gas outlet. The sealing body has a cylindrical cross-section adapted and configured to provide a gap in between a circumferential edge of the sealing body and an inner surface of the pressure vessel. The sealing body comprises first and second sealing plates where a planar face of the first sealing plate is flush with a planar face of the second sealing plate, and a composite seal that is disposed around a circumferential edge of the sealing body in a groove formed in between the first and second sealing plates and that is slidingly compressed against an inner surface of the pressure vessel to provide a seal between a side thereof that is exposed to feed gas and a side thereof that is exposed to non-permeate gas. The sealing body includes an opening, the single, integrated outer tube extending through the sealing body opening and terminating in the open end thereof so that non-permeate gas can flow from the annular space and out of the pressure vessel via the non-permeate outlet.

There is also disclosed a method of retrofitting a conventional gas separation membrane module including spiral-wound-type membranes arranged in series so as to have hollow fiber-type membranes arranged in parallel. The method comprises the following steps. A conventional gas separation membrane module to be retrofitted is provided. The conventional gas separation module comprises: a tubular pressure vessel having at least one feed gas inlet, at least one permeate gas outlet, and a non-permeate gas outlet; a plurality of connected, spiral-wound-type membrane elements arranged in series disposed within the pressure vessel; and an upstream seal for preventing feed gas from leaking into an annular space in between an outer surface of an upstream-most of the plurality of spiral-wound-type membrane elements and an inner surface of a pressure vessel. The upstream seal and the plurality of connected, spiral-wound-type membrane elements arranged in series are removed from within the pressure vessel. A downstream hollow fiber membrane element is slid into the pressure vessel, leaving an end of the first hollow fiber membrane element accessible from an open end of the pressure vessel, a downstream end of the downstream hollow fiber membrane being provided with a sealing body. One or more hollow fiber membrane elements are sequentially connected to the accessible end of the first hollow fiber membrane element to provide a growing chain of membrane elements connected in parallel while the growing chain of membrane elements is sequentially slid into the pressure vessel away from the open end of the pressure vessel. An upstream hollow fiber membrane element is connected to the growing chain of connected membrane elements to provide a completed chain of membrane elements connected in parallel. The completed chain of membrane elements is slid further downstream into the pressure vessel. The upstream end of the upstream hollow fiber membrane element is fluidically connected to the permeate outlet in gas-tight fashion. Said at least one sealing body that is provided to the downstream end of the downstream hollow fiber membrane is disposed around the outer tube of the associated membrane element at an axial position within the pressure vessel in between the downstream hollow fiber membrane element and the non-permeate gas outlet. The sealing body has a cylindrical cross-section adapted and configured to provide a gap in between a circumferential edge of the sealing body and an inner surface of the pressure vessel. The sealing body comprises first and second sealing plates where a planar face of the first sealing plate is flush with a planar face of the second sealing plate, and a composite seal that is disposed around a circumferential edge of the sealing body in a groove formed in between the first and second sealing plates and that is compressed against an inner surface of the pressure vessel to provide a seal between a side thereof that is exposed to feed gas and a side thereof that is exposed to non-permeate gas. The sealing body includes an opening through which non-permeate gas can flow from the completed chain of connected membrane elements and out of the pressure vessel via the non-permeate outlet. Said steps of sliding a downstream hollow fiber membrane element and sliding the completed chain of membrane elements are performed only with human power.

Either or both of said gas separation membrane module and said method may include one or more of the following aspects:
- for each membrane element, each of the associated plurality of fibers has a first end that is open and is encased by a polymeric tubesheet and a second end that is sealed; each of the tubesheets includes a plurality of channels that fluidly communicate with the associated first open fiber ends; and for each tubesheet, the associated plurality of channels fluidly communicate with an associated permeate gas passageway that comprises a pipe extending from an opening in a wall of the outer tube to an opening in a wall of the inner tube, the permeate gas passageways being leak-tight in that non-permeate gas in the outer tube is prevented from leaking into the inner tube at the passageways.
- the composite seal comprises an o-ring nestled in a cup seal, the open end of the cup seal facing upstream.
- the o-ring is continuous.
- the o-ring is discontinuous so as to have a gap therein.
- the o-ring has a Shore type-A hardness of less than 90 durometers.
- the o-ring has a Shore type-A hardness of 50 durometers.
- the gap ranges from 0.125-0.500 inches.
- the o-ring has a Shore type-A hardness of less than 90 durometers.
- the o-ring has a Shore type-A hardness of 50 durometers.
- the plurality of membrane elements comprises an upstream membrane element, a downstream membrane element, and at least one intermediate membrane element positioned between the upstream and downstream membrane elements; and the permeate gas outlet is disposed at a position adjacent one end of the pressure vessel and the non-permeate gas outlet is disposed at a position adjacent an opposite end of the pressure vessel.
- the plurality of membrane elements comprises a right-hand side group of membrane elements and a left-hand side group of membrane elements; the right-hand side group of membrane elements comprises an upstream membrane element, a downstream membrane element, and at least one intermediate membrane element positioned between the upstream and downstream membrane elements; the left-hand side group of membrane elements comprises an upstream membrane element, a downstream membrane element, and at least one intermediate membrane element positioned between the upstream and downstream membrane elements; the at least one sealing body comprises a right-hand side sealing body and a left-hand side sealing body, the right-hand side sealing element being disposed around the outer tube at the downstream element of the right-hand side group of membrane elements, the left-hand side sealing element being disposed around the outer tube at the downstream element of the left-hand side group of membrane elements; the pressure vessel has opposite ends; the at least one feed gas inlet comprises two feed gas inlets each of which is disposed adjacent to one of the opposite ends of the pressure vessel; the at least one permeate gas outlet comprises two permeate gas outlets each of which is disposed adjacent to one of the opposite ends of the pressure vessel; and the permeate gas outlet is disposed between the left-hand and right-hand side sealing bodies.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DEFINITIONS USED TO DESCRIBE THE INVENTION OR VARIOUS ASPECTS THEREOF

Figure 1:
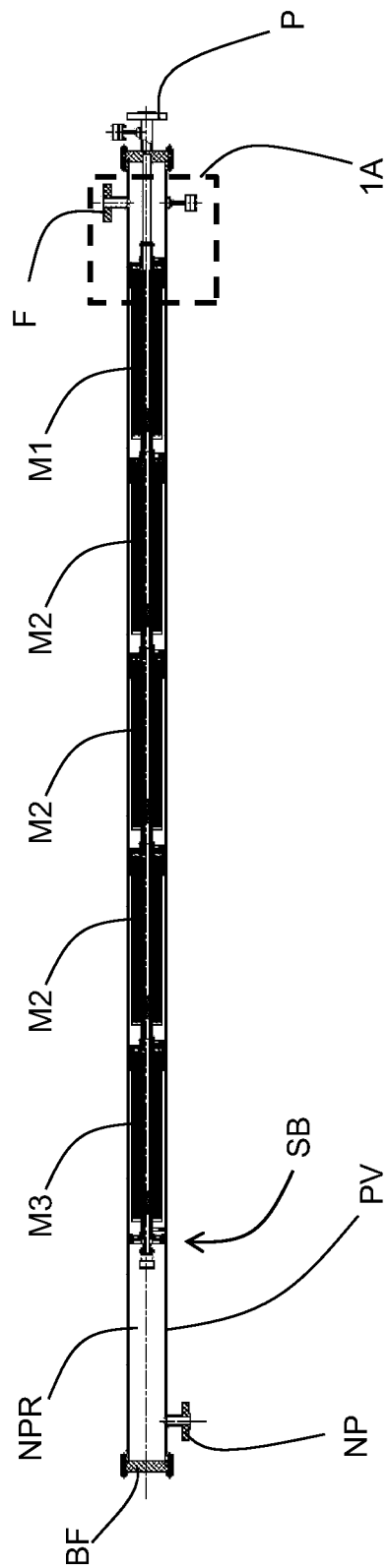
FIG. 1 is a cross-sectional elevation view of a membrane module within the scope of the invention.

Gas separation membrane: a structure made of a material that exhibits greater permeance of one or more fluids over other fluids, including one that is configured as one or more spiral-wound sheets and one that is configured as a plurality of hollow fibers.

Feed gas: a gas or gaseous mixture that is fed to a membrane.

Permeate gas: the gas or gaseous mixture withdrawn from the membrane that is enriched in one or more gases that the gas separation membrane exhibits greater permeance thereof.

Non-permeate gas: the gas or gaseous mixture withdrawn from the membrane that is deficient in one or more gases that the gas separation membrane exhibits greater permeance thereof.

Pressure vessel: a generally fluid-tight structure, often tubular in form, that is adapted and configured to contain one or more membrane elements and that includes at least one port for a feed fluid, at least one port for withdrawal of a permeate fluid, and at least one port for withdrawal of a non-permeate fluid.

Gas separation membrane module: one or more gas separation membrane elements installed in a pressure vessel.

Upstream and downstream: a description of the relative position of one feature of a gas separation membrane module with respect to another feature of the module in the context of the flow direction of the feed gas. When the feed gas is fed at both ends of the pressure vessel and the non-permeate gas is withdrawn from a port adjacent a middle of the pressure vessel, the flow direction of the feed gas on the right-hand side of the non-permeate gas withdrawal port is opposite the flow direction of the feed on the left-hand side of the non-permeate gas withdrawal port. In this latter case, the terms upstream and downstream are used in the context of either the associated portion of the membrane module to the right of the non-permeate gas withdrawal port or the associated portion of the membrane module to the left of the non-permeate gas withdrawal port, as the case may be.

Series: an arrangement of multiple gas separation membrane elements in a pressure vessel where the non-permeate gas of an upstream membrane element constitutes the feed gas of an adjacently downstream membrane element.

Parallel: an arrangement of multiple gas separation membrane elements in a pressure vessel where the feed gas permeates through each of the membrane elements, the permeate gas from each membrane element is combined with those of the other membrane elements, and the non-permeate gas from each membrane element is combined with those of the other membrane elements.

Slidingly compressed or slidable: properties exhibited by a sealing body of the inventive gas separation membrane module characterized by the ability of the sealing body to be slid into the pressure vessel without experiencing damage as it is slid across openings and the ability of the sealing body to be slid into the pressure vessel with only human force and not requiring mechanical assistance in all cases.

LIST OF REFERENCE CHARACTERS

PV: pressure vessel
F: feed gas port F
P: permeate gas port
NP: non-permeate gas port
M1, M2, M3: membrane element
BF: blind flange
SB: sealing body
1: feed gas reservoir 1
2: feed gas flow
3: annular space
4: plurality of hollow fibers
5: inner tube
6: flow of permeate gas
7: permeate collection conduit
8: outer tube
9: non-permeate gas flow
10: tube sheet
11: hollow fiber ends encapsulated with polymeric mass
12: support leg
13: roller ball
14: support ring
15: first element of permeate gas collection manifold
16: second element of permeate gas collection manifold
17: second element of permeate gas collection manifold
18: threaded fastener
19: annular groove
20: ellipsoidal radially extending hollow
21: wedge-shaped radially extending void
22: annular wedge-shaped hollow
23: slot
24: o-ring
25: retaining ring
26: bushing
27: permeate passageway
28: fastening ring
29: female ring
30: post
31: support ring
32: front seal plate
33: rear seal plate
34: composite seal
35: o-ring
36: cup seal
37: clamp

DESCRIPTION OF PREFERRED EMBODIMENTS

As best illustrated in FIG. 1, a gas separation membrane module includes a pressure vessel PV provided with a feed gas port F, a permeate gas port P, a non-permeate gas port NP, and several membrane elements M1, M2, M3. At an end of the module opposite the permeate port P, the pressure vessel PV is sealed with a blind flange BF. A sealing body SB is disposed between the most downstream membrane element M3 and a non-permeate reservoir NP.

Figure 2:
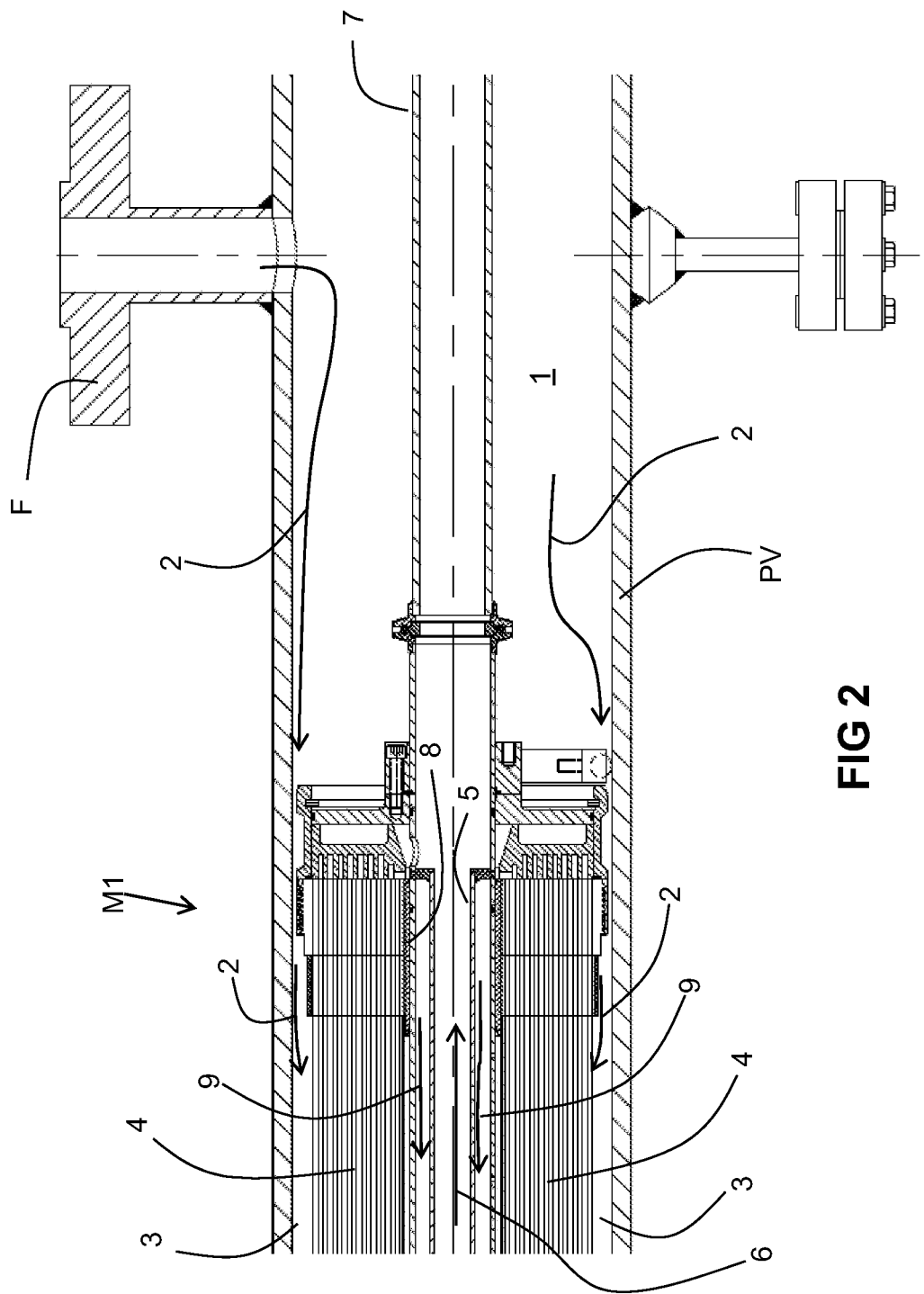
FIG. 2 is a zoomed view of portion 1A of the membrane module of FIG. 1.

In a zoomed view of portion 1A of FIG. 1, FIG. 2 shows the flows of gases at the upstream portion of membrane element M1. Feed gas 2 flowing within feed gas reservoir 1 enters into an annular space 3 in between pressure vessel PV and an outer surface of membrane element M1. The feed gas 2 flows over and in between individual ones of a plurality of hollow fibers 4. The flow patterns described in this paragraph are replicated in each of the other membrane elements M2, M3.

While the hollow fibers 4 are illustrated as extending parallel to a main axis of the membrane element M1, they may be helically wound instead. The hollow fibers 4 include a separation layer made of a material that exhibits greater permeance for some gases than others. The type of material is chosen based upon the separation sought to be achieved. For example, a material exhibiting greater permeance for $CO_2$ over methane may be useful for separation $CO_2$ from natural gas. At walls of the hollow fibers 4, the "fast" gases (i.e., those gases which the membrane exhibits greater permeance for) permeate across and enter inside the bores of the hollow fibers 4 as the "slow" gases (i.e., those gases which the membrane exhibits lesser permeance for) continue to flow over and in between individual hollow fibers 4. The permeate gas 6, now enriched in the fast gases compared to the feed gas 2, are collected and flow in inner tube 5. The travel of the permeate gas 6 from the bores of the hollow fibers 4 and into the inner tube 5 is detailed below. The non-permeate gas 9, now deficient in the fast gases compared to the feed gas 2, are collected and flow in an annular space in between inner tube 5 and outer tube 8.

Figure 3:
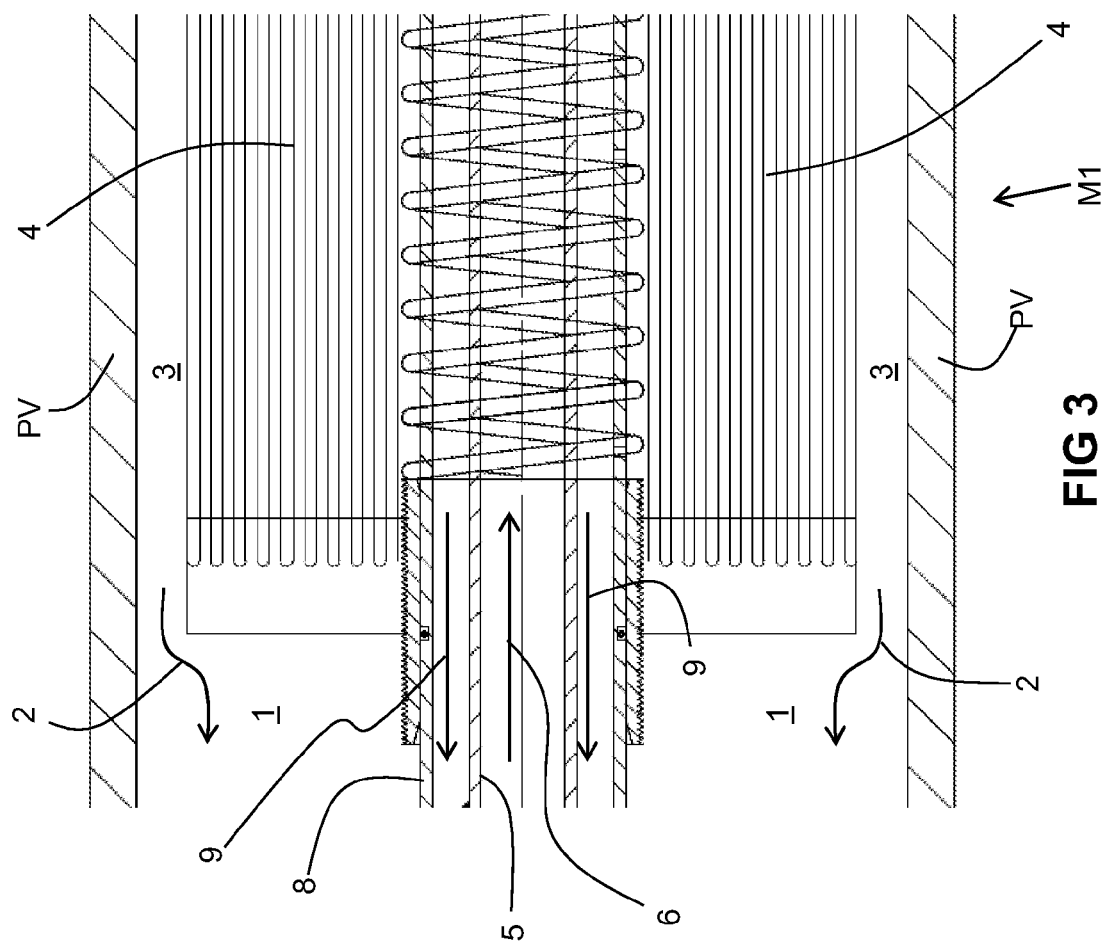
FIG. 3 is a cross-sectional elevation view of a downstream end of the membrane element M1 of the membrane module of FIG. 1.

As shown in FIG. 3, feed gas 2 not flowing over and between the hollow fibers 4 flows out of annular space 3 and into feed gas reservoir 1 adjacent the downstream end of membrane element M1. Permeate gas 6 from adjacently downstream membrane element M2 flows within inner tube 5 towards the permeate port P. The flow patterns described in this paragraph are replicated in each of membrane elements M2. As seen in FIG. 3, the direction of the flow of permeate gas 6 is opposite that of the feed gas 2.

Now the upstream face of each membrane element M1, M2, M3 will be described as well as how the flows of permeate gas 6 and non-permeate gas 9 are collected in the inner tube 5 and the annular space between the inner and outer tubes 5, 8. It should be noted that the upstream face of each membrane element M1, M2, M3 is configured the same except for membrane element M1 as explained below with reference to FIG. 7.

As seen in FIGS. 4-5 and 10-11, upstream ends of the hollow fibers 4 are encased in polymeric tubesheet 10 and downstream ends are encased in polymeric mass 11 designed to seal the downstream ends of the hollow fibers 4. Attached to a front face of tubesheet 10 is a permeate gas manifold that includes three elements 15, 16, 17 made of any suitably non-reactive, gas-tight material, such as stainless steel. The third element 17 starts off configured as a ring. An annular slot 23 of relatively shorter thickness and a plurality of annular grooves 19 of relatively greater thickness are machined into the downstream face. A plurality of wedge-shaped voids 21 are machined into the upstream face for the purpose of reducing a mass of the manifold. An annular wedge-shaped hollow 22 is also machined into the upstream face that converges in the downstream direction. Abutting against an upstream face of the third manifold element 17 is second manifold element 16. The second and third manifolds elements 16, 17 fit together to further define the voids 21 and annular wedge-shaped hollow 22. An adhesive such as epoxy is applied around a circumferential surface of the tubesheet 10 and the first manifold element 15 is placed around the combined second/third elements 16, 17. A retaining ring 16 inserted into a groove in the first manifold element 15 holds the second and third manifold elements 16, 17 into place. After curing, the bond between the first manifold element 15 and the tubesheet 10 and the retaining ring 16 abutting against the second manifold element 16 act to hold the first, second, and third manifold elements 15, 16, 17 together and in place around and upon an upstream face of the membrane element M2. The upstream faces of the remaining membrane elements, M1, M3 are each similarly featured. A support ring 14 is slid over the outside surface of the upstream end of the outer tube 8 where it abuts against a retaining ring 25 and an upstream face of the permeate gas manifold. O-rings 24 act to prevent leaks of feed gas 2 into the outer tube 8. Finally, a threaded fastener 18 is used to secure support ring 14 against the permeate gas manifold.

Figure 5:
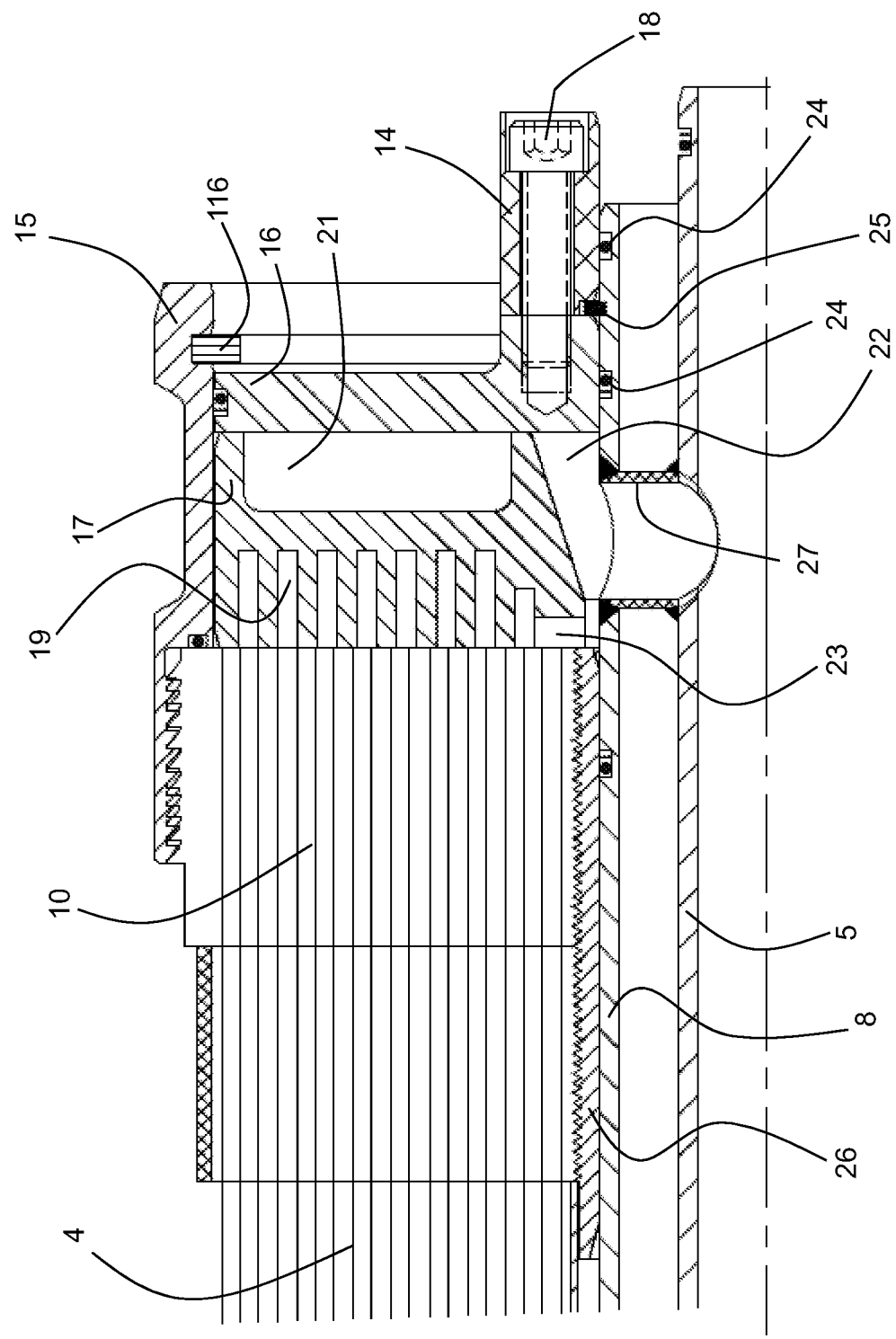
FIG. 5 is a cross-sectional elevation view, with parts removed of an upstream end of one of the membrane elements M2.
Figure 10:
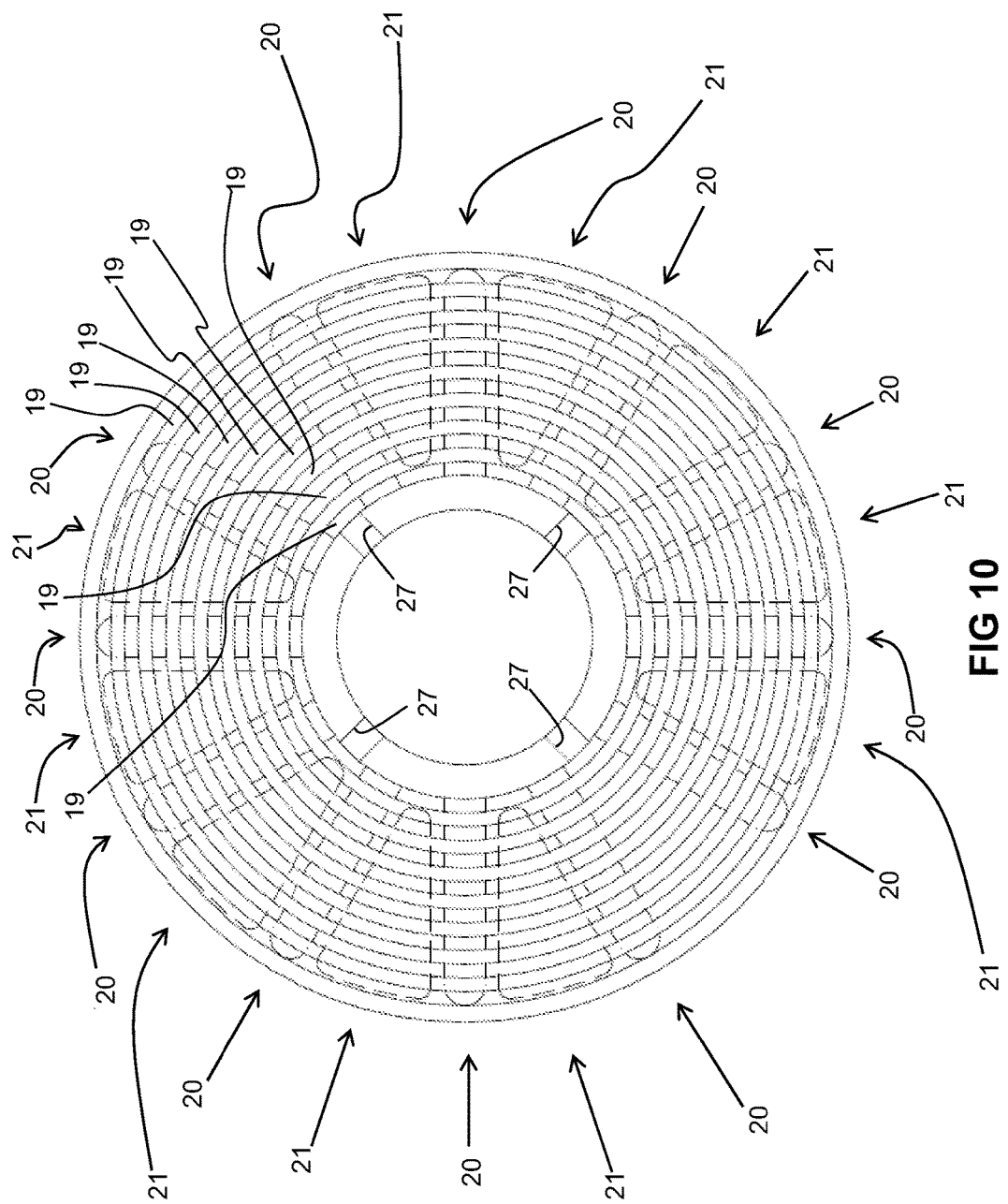
FIG. 10 is a cross-sectional end view of the membrane element M2 of FIG. 4 taken along A-A.
Figure 11:
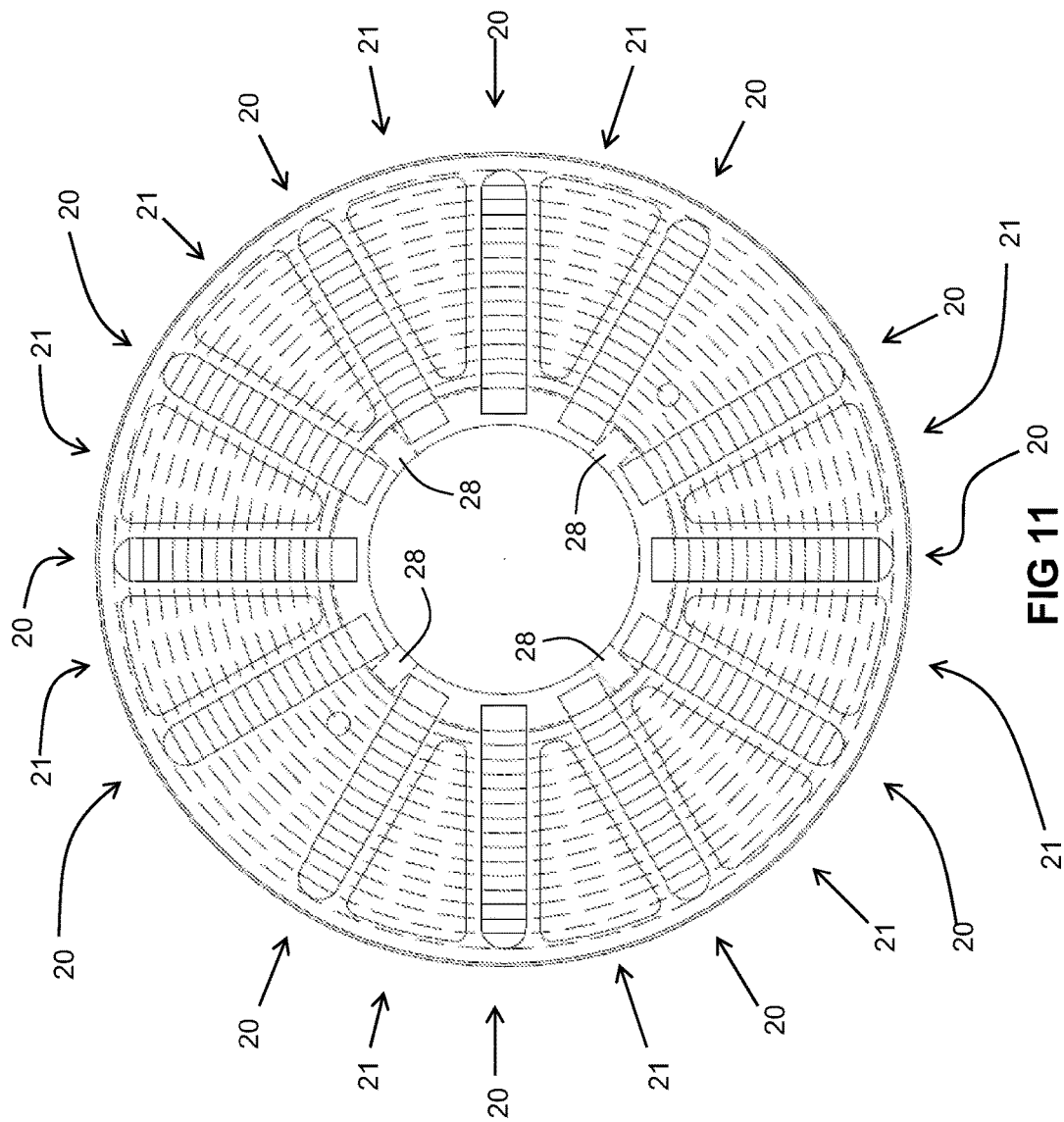
FIG. 11 is a cross-sectional end view of the membrane element M2 of FIG. 4 taken along B-B.

As best illustrated in FIGS. 5, 10, and 11, the permeate gas 6 in bores of hollow fibers 4 is collected in annular grooves 19 and flow into axially-extending ellipsoidal hollows 20 which intersect the annular grooves 19. From there, the permeate gas 6 flows into slot 23 which intersects hollows 20. The permeate gas 6 then enters into the inner tube 5 via slot 23, annular wedge-shaped hollow 22, and permeate passageway 27. Permeate passageway 27 is received into and welded on one end thereof to an aperture formed in the outer tube 8 and on the other end to an aperture formed in the inner tube 5. Non-permeate gas 9 passes through perforations in bushing 26 and outer tube 8.

Figure 4:
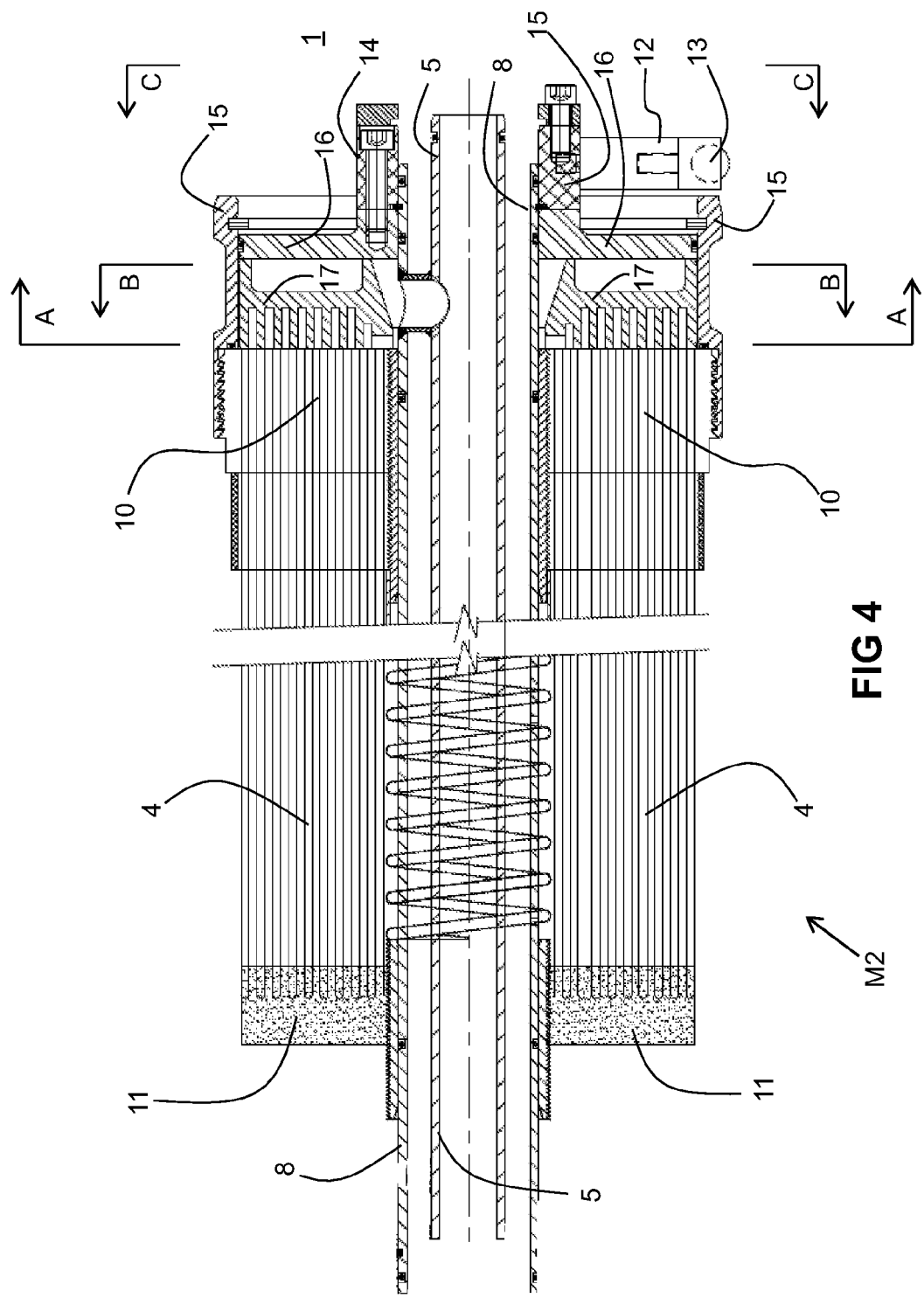
FIG. 4 is a broken, cross-sectional elevation view of one of the membrane elements M2 of the membrane module of FIG. 1.
Figure 12:
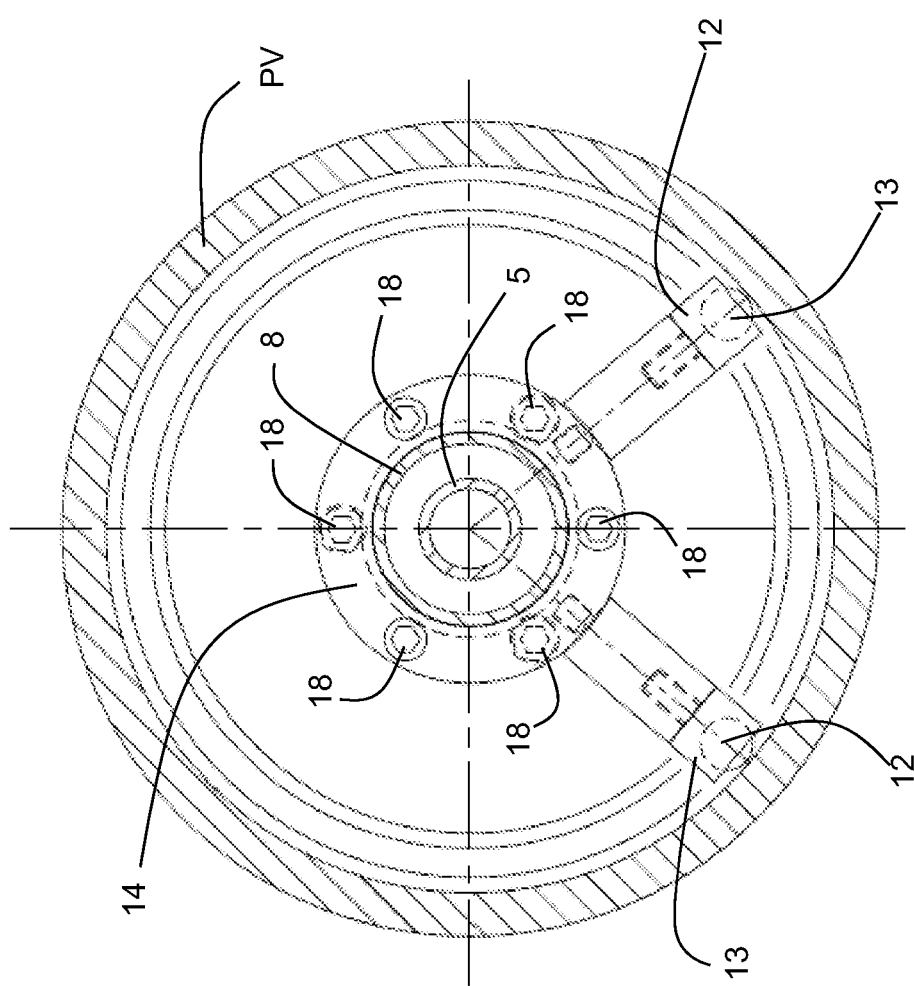
FIG. 12 is an end view of the membrane element M2 of FIG. 4 taken along C-C also including pressure vessel PV.

As best shown in FIGS. 4 and 12, two support legs 12 are attached to support ring 14. Each support leg 12 engages and loosely holds a roller ball 13 resting on an inner surface of the pressure vessel PV. With proper dimensioning, the support leg 12, roller ball 13, and support ring 14 allow the membrane elements M1, M2, M3 to be centered within pressure vessel PV and allow a more or less uniform thickness for the annular space 3 in between the inner surface of the pressure vessel PV and the outer circumferential surface of the membrane elements M1, M2, M3.

Figure 6:
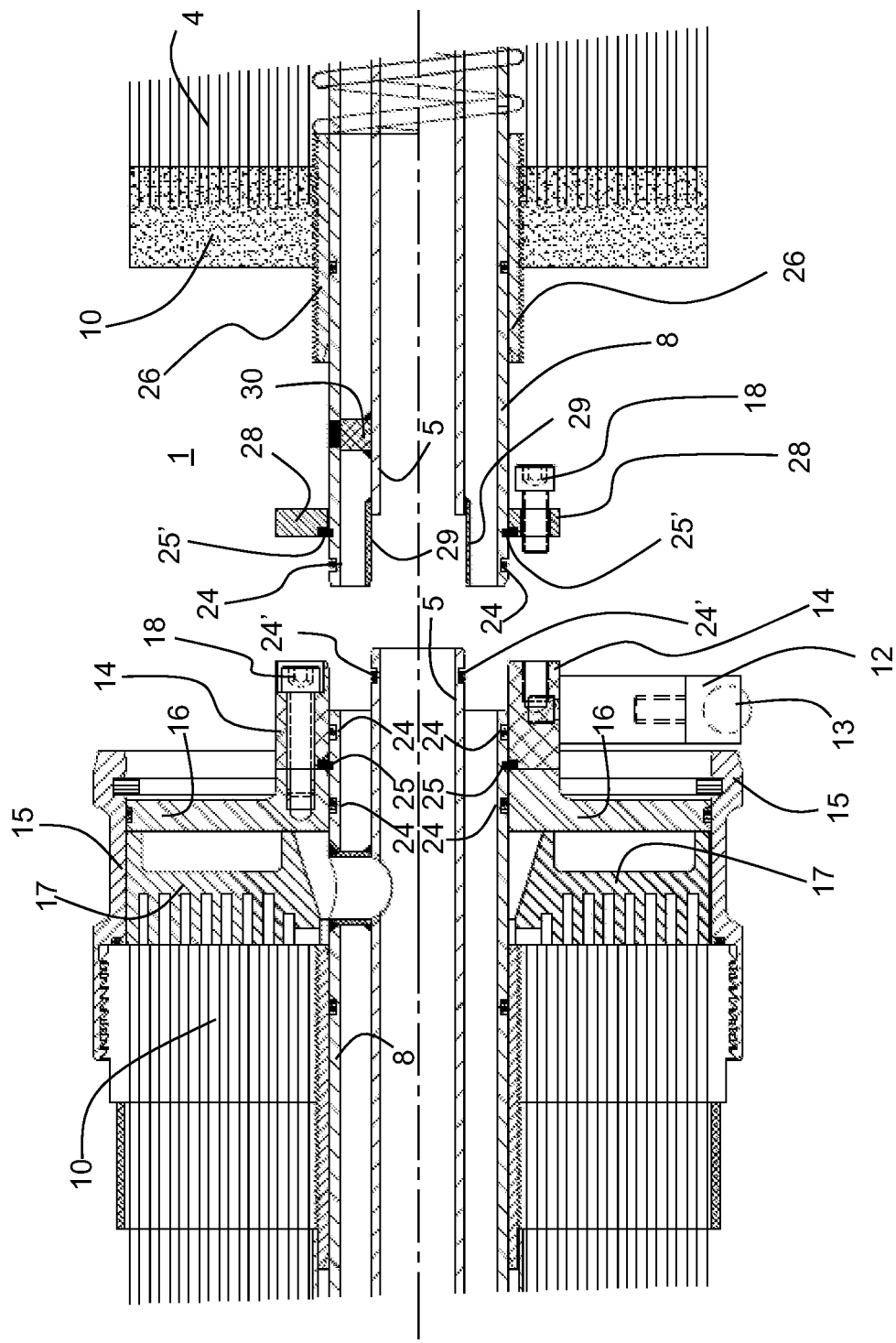
FIG. 6 is a cross-sectional, exploded view, with parts removed, of a upstream end of membrane element M3 and an downstream end of adjacent membrane element M2.

FIG. 6 illustrates the way in which the farthest downstream membrane element M2 is connected to membrane element M3. The inner and outer tubes 5, 8 of element M2 are aligned with those of element M3 and element M2 is urged towards membrane element M3. As element M2 continues to be urged towards element M3, female ring 29 slides over inner tube 5 of element M3 and outer tube 8 of element M2 is received within support ring 14 of element M3. Element M2 continues to be urged towards element M3 until the upstream-most portion of inner and outer tubes 5, 8 of element M2 abuts against the downstream-most portion of inner and outer tubes 5, 8 of element M3. The two elements M2, M3 are secured to one another via threaded fastener 18 inserted through a threaded bores in lower portions of fastening ring 28 of element M2 and support ring 14 of element M3. The position of fastening ring 28 is fixed because it held against retaining ring 25' spot-welded to outer tube 8 of element M2. After connection, non-permeate gas is prevented from entering into inner tube 5 where the inner tubes 5 of elements M2, M3 meet through provision of a sealing O-ring 24' that is compressed in between a groove formed in an outer surface of the inner tube 5 of element M3 and the female ring 29. As seen in FIG. 6, a post 30 is connected to each of the inner and outer tubes 5, 8 at the downstream portion of element M2 in order to provide greater structural stability and strength.

Those skilled in the art will recognize that the individual inner tubes of the plurality of membrane elements M1, M2, and M3 together comprise a single integrated, inner tube. They will also recognize that the outer tubes of the plurality of membrane elements M1, M2, M3 together comprise a single integrated, outer tube. They will further recognize that the single integrated inner and outer tubes provide flow passages for flows of the permeate and non-permeate gases in the membrane module of the invention.

Figure 7:
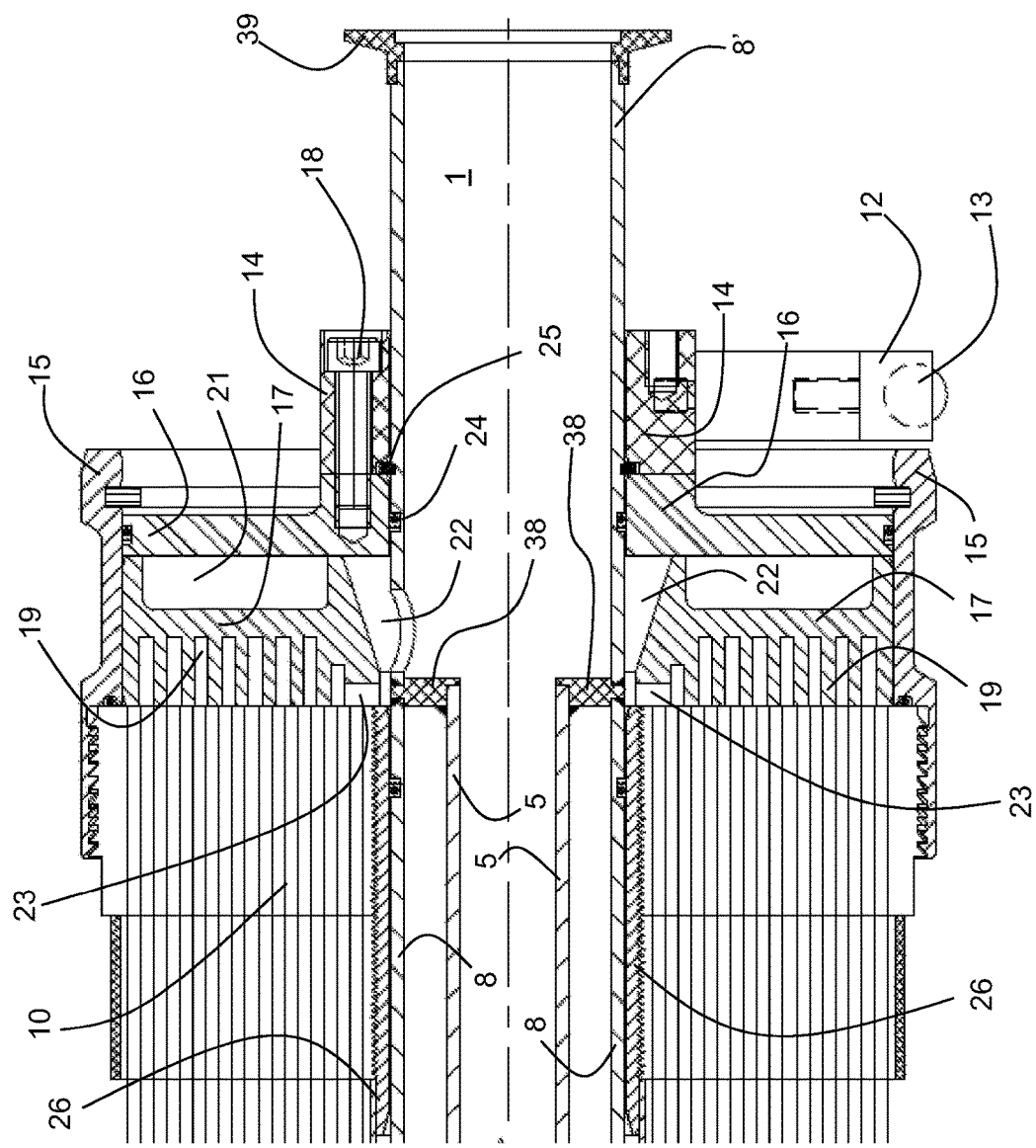
FIG. 7 is a cross-sectional elevation view of an upstream end of membrane element M1.

As mentioned above, the upstream face of each membrane element M1, M2, M3 is configured the same except for membrane element M1. As best illustrated in FIG. 7, the inner tube 5 of element M1 does not extend upstream past the permeate gas manifold. Rather, the annular space defined between the inner and outer tubes 5, 8 in element M1 is blocked by sealing ring 38 just upstream of annular wedge-shaped hollow 22. Also, the outer tube 8 of element M1 does not terminate at a point just upstream of support ring 14. Rather, it includes an extension 8' that extends farther upstream past support ring 14 in comparison to the other elements M2, M3. The extension 8' is connected to the permeate collection conduit 7 via clamp 39.

Figure 8:
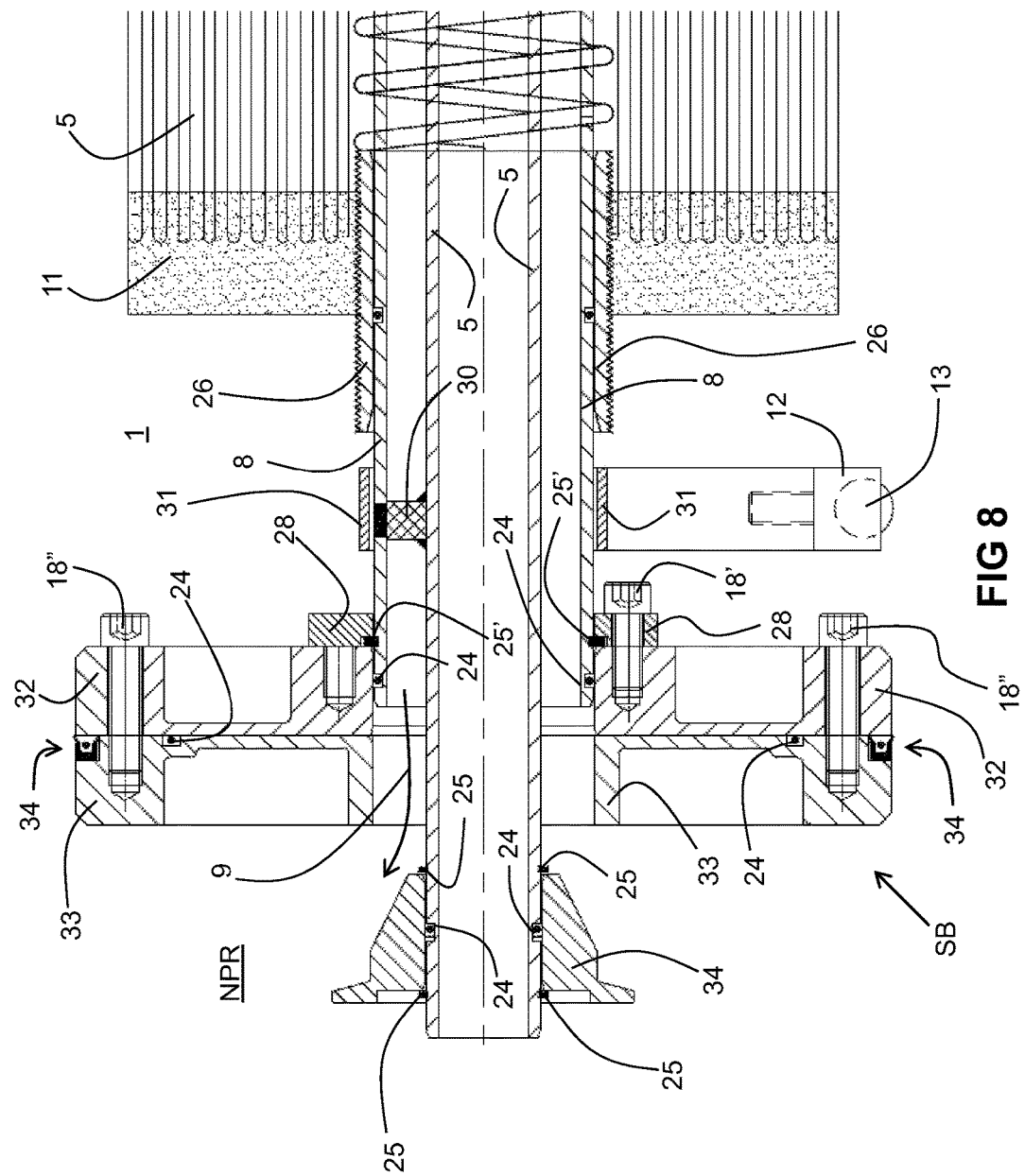
FIG. 8 is a cross-sectional elevation view of a downstream end of membrane element M3 of the membrane module of FIG. 1.

As best shown in FIG. 8, the downstream portion of element M3 differs from the other elements M1, M2. In element M3, the outer tube 8 does not project farther downstream than inner tube 5. Rather, the inner tube 5 of this particular element M3 extends a distance well beyond the outer tube 8. Because element M3 is the furthest downstream and is not connected to a membrane element at its downstream end, the inner tube 5 also does not include a female ring 29. Also, element M3 is axially aligned within pressure vessel PV with the aid of support ring 31 which loosely engages an outer surface of outer tube 8. Attached to support ring are two support legs 12 each one of which engages and loosely holds a roller ball 13 resting on an inner surface of the pressure vessel PV. With proper dimensioning, the support leg 12, roller ball 13, and support ring 14 further allow the connected chain of membrane elements M1, M2, M3 to be centered within pressure vessel PV and allow a more or less uniform thickness for the annular space 3 in between the inner surface of the pressure vessel PV and the outer circumferential surface of the membrane elements M1, M2, M3.

Most importantly, a sealing body SB is secured to the downstream portion of element M3. The sealing body SB includes complementarily shaped front and rear sealing plates 32, 33 which are secured to one another via threaded fastener 18". A composite seal 34 is fitted into a groove formed in an upstream face of the rear sealing plate 33. The sealing body SB is secured to the outer tube 8 by placing fastening ring 28 against one side of retaining ring 25, placing sealing body SB against the other side of retaining ring 25, and securing the fastening ring 28 to the front sealing plate 32 with threaded fastener 18' to compress the fastening ring 28 and front sealing plate 32 against retaining ring 25. In this manner, the position of the sealing body SB becomes fixed relative to element M3.

With continued reference to FIG. 8, feed gas in feed gas reservoir 1 is prevented from leaking in between the inner surface of the front sealing plate 32 and the outer surface of the outer tube 8 and entering the annular space between the inner and outer tubes 5, 8 by placement of O-ring 24. This o-ring 24 is placed in a groove formed in the outer surface of the outer tube 8 adjacent to an inner surface of the front sealing plate 32. Non-permeate gas is contained within the downstream end of inner tube 5 by placement of an appropriate valve (not illustrated) secured in gas-tight fashion to the downstream end of inner tube 5. The non-permeate gas exits the annular space in between inner and outer tubes 5, 8 as flow 9 into the non-permeate reservoir NPR and out of the pressure vessel at non-permeate port NP.

Those skilled in the art will recognize that the individual inner tubes of the plurality of membrane elements M1, M2, and M3 together comprise a single integrated, inner tube. They will also recognize that the outer tubes of the plurality of membrane elements M1, M2, M3 together comprise a single integrated, outer tube. They will further recognize that the single integrated inner and outer tubes provide flow passages for flows of the permeate and non-permeate gases in the membrane module of the invention.

The invention is not limited to the above-described configuration where the permeate and non-permeate gases are withdrawn from opposite ends of the membrane module. Alternatively, the feed gas may be fed at each end of the pressure vessel, the permeate gas withdrawn from each end of the pressure vessel, and the non-permeate gas withdrawn from a position adjacent the middle of the pressure vessel (i.e., it only need be near the middle and does not have to be the exact middle). Those of ordinary skill in the art will recognize that such a configuration will include a chain of the coupled elements M1, M2, M3 of FIGS. 2-12 on a right-hand side of the pressure vessel (extending from the right-hand side to the middle of the pressure vessel) and the mirror-image chain of coupled elements M1, M2, M3 on a left-hand side of the pressure vessel (extending form a left-hand side to the middle of the pressure vessel). In between the sealing body SB of the right-hand side chain of coupled elements M1, M2, M3 and the sealing body SB of the left-hand side chain of coupled elements M1, M2, M3 is the non-permeate gas withdrawal port.

Regardless of which alternative configuration is utilized, the sealing body SB also provides a seal in between the feed gas in feed gas reservoir 1 and the non-permeate gas in non-permeate reservoir NP. Because the pressure difference between the feed gas in feed gas reservoir 1 and the non-permeate gas in non-permeate reservoir NP may vary between less than 1 bar and as much as 24 psig, the sealing body SB must contain features allow a gas-tight seal in both low pressure and high pressure conditions.

Because the sealing body SB is secured to the downstream end of element M3, it must also be able to be slid, by an operator without mechanical assistance, from an open end of the pressure vessel PV to either a middle of the pressure vessel PV (in the case of a membrane module where permeate is withdrawn from both ends and the non-permeate is withdrawn from the middle) or to the far, blind end of the pressure vessel PV. In other words, it must exhibit satisfactory "slidability". For example, it must be able to be slid inside the pressure vessel using only as much as 10 pounds of force.

The sealing body SB must also be able to be slid to either a middle of the pressure vessel PV or to a far, blind end of the pressure vessel, across openings in the pressure vessel PV (such as the feed gas port, the permeate port, or the non-permeate port) without being damaged. Certain conventional seals include compressible members, such as elastomeric materials, that are designed to be compressed against the inner surface of a pressure vessel. As a portion of the compressible member is slid from a position flush with the inner surface of the pressure vessel PV to a position adjacent the opening, a stress is placed upon that member as it crosses the edge of the opening that will tend to tear the compressible member if it has been compressed enough against the pressure vessel. Those skilled in the art of gas separation membrane modules will recognize that o-rings that otherwise exhibit satisfactory compressibility for sealing at low and high differential pressures are considered completely unsatisfactory if they need to be slid across an opening in the pressure vessel.

The four properties mentioned above (the ability to seal at relatively low pressure differentials, the ability to seal at relatively high pressure differentials, and the ability to be slid inside the pressure vessel PV (to at least the middle thereof) without requiring mechanical assistance or experiencing damage are all required in the invention. This is an important point because we are unaware of any conventional seal used in the field of gas separation membrane modules that satisfies all four properties. For example, a seal that is "slideable" and provides a gas-tight seal at relatively low pressure differentials (between the feed and non-permeate gases) of about 5 psig, but exhibited leaks at greater pressure differentials, would be unsatisfactory for the intended purpose. As another example, a seal that provides a gas-tight seal at both relatively low and high pressure differentials (from less than 5 psig and as much as 50 psig) but which cannot be slid without mechanical assistance would be similarly unsatisfactory.

Figure 9:
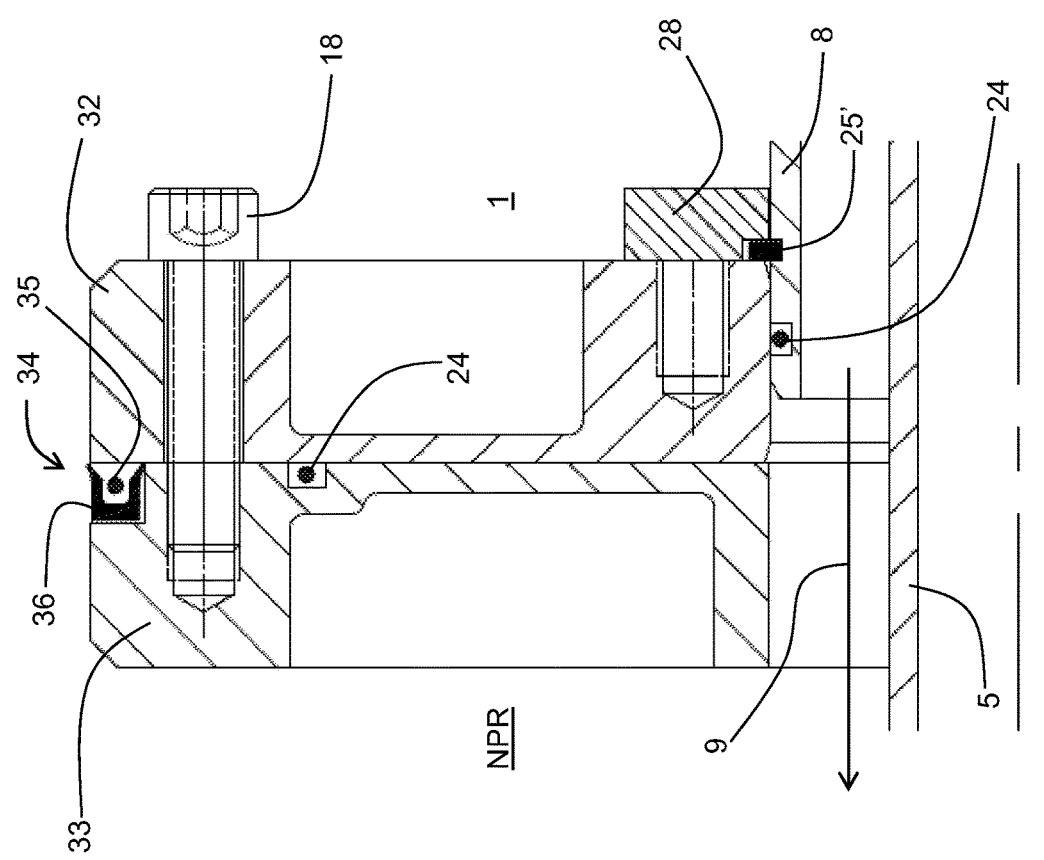
FIG. 9 is a cross-sectional elevation view of sealing body SB of membrane element M3.

Through trial and error, we discovered that a composite seal 34, that includes an o-ring 35 positioned within the hollow of a cup seal 36 (as best shown in FIG. 9), satisfies the four above-described properties. Those of ordinary skill in the art will recognize that a cup seal 36 is a ring-shaped seal having a hollow (in which o-ring 35 may be positioned) in the middle and an open side that faces the high pressure side. The composite seal 34 of the invention may be contrasted with conventional seals that do not satisfy all four of the above-described properties.

Certain conventional seals that exhibit satisfactory gas-tightness at each of the above-described pressure differential conditions cannot be slid to a position at least midway down the pressure vessel without mechanical assistance. We believe that the relatively high stiffness of such seals that is necessary to provide the gas-tight seal at both pressure differential conditions renders it very difficult to slide the seal within the pressure vessel PV. While we believe that this latter category of seals can probably be slid with mechanical assistance (for a force of 200 or more pounds), the installation and/or replacement of membrane elements in many modules must be performed under very challenging conditions in which it simply is not possible to utilize mechanical assistance.

The composite seal 34 of the invention utilizes a cup seal 36 provided with an o-ring 35 within the hollow of the cup seal 36 in order to pre-load the inner and outer side walls (i.e., the side wall along the inner diameter of the cup seal 36 and the side wall along the outer diameter of the cup seal 36). Because the inner and outer side walls are already biased inwardly and outwardly, they composite seal 34 is able to satisfactorily seal at the above-described low pressure differential. By selecting an appropriately sized o-ring 35 having an appropriate stiffness in the cup seal 36, a composite seal 34 may be assembled that still exhibits the necessary slidability (both in terms of not requiring mechanical assistance and also not experiencing damage while being slid across openings). The composite seal 34 is still slidable because some of the space in between the inner and outer side walls of the cup seal 36 is empty. This empty space allows the edges of the inner and outer side walls of the cup seal 36 to be compressed outwardly and inwardly, respectively, so that the distance between those side wall edges is incrementally smaller and thus easier to slide. This incrementally smaller distance between the side wall edges also results in less stress placed upon the outer side wall as it is slid across an opening in the pressure vessel PV. As a result, it is not torn and does not experience damage.

Certain conventional cup seals pre-loaded with o-rings are too stiff to allow a sealing body SB to be slid into pressure vessel PV without requiring mechanical assistance such as from a hydraulic press. We have addressed this problem by avoiding the use of o-rings 35 (loaded within cup seal 34) that having Shore (type A) hardnesses of 90 or greater durometers. Certain other conventional cup seals pre-loaded with o-rings having hardnesses of less than 90 durometers may still render the composite seal 34 too stiff for the sealing body SB to be slid into pressure vessel PV without requiring mechanical assistance. We have addressed this problem by using an o-ring 35 (pre-loaded in the cup seal 36) that includes discontinuities. What we mean by this is that the presence of gaps in the o-ring 35 allow slidability for the sealing body SB when those o-rings 35 would not otherwise allow slidability for the sealing body SB when there are no gaps in the o-ring 35. For example, for a pressure vessel PV having a diameter of about 8 inches, a gap in the o-ring 35 (having a hardness of 50 durometers) of 0.125-0.50 inches still provides excellent sealing properties at both low (up to 5 psig) and high (up to 50 psig) pressure differential conditions.

Now, assembly of the gas separation membrane module will be described.

The sealing body SB is secured to membrane element M3 as described above. After loading element M3 into the pressure vessel PV, it is slid slightly downstream inside the pressure vessel PV towards the non-permeate port NP, leaving the upstream end of element M3 exposed. Next, the most downstream one of the membrane elements M2 is connecting to element M3 as described above. Once connected, the coupled elements M2, M3 are slid downstream inside the pressure vessel PV leaving the upstream end of element M2 exposed. Each one of the additional membrane elements M2 is sequentially connected to the already-coupled elements as described above and the chain of coupled elements M2, M3 is sequentially slid further into the pressure vessel PV. Finally, membrane element M1 is connected to the most upstream one of the membrane elements M2 in the same way and the now-completely coupled chain of elements M1, M2, M3 is slid further into the pressure vessel PV, leaving the extension 8' of element M1 exposed. The permeate collection conduit 7 is then connected to the upstream end of extension 8' via clamp 39.

One of ordinary skill in the art will recognize that the alternative configuration (where feed gas is fed at each end of the pressure vessel, the permeate gas withdrawn from each end of the pressure vessel, and the non-permeate gas withdrawn from a position adjacent the middle of the pressure vessel) may be assembled in the same way described above except that two chains of coupled elements M1, M2, M3 are slid into opposite ends of the pressure vessel.

In one especially suitable application of the invention, a gas separation membrane module including spiral-wound-type membranes arranged in series may be replaced with hollow fiber-type membranes arranged in parallel. This may be done as follows. The seal (for preventing feed gas from leaking into the annular space in between the outer surface of the upstream-most membrane element and the inner surface of the pressure vessel) at an upstream end of the pressure vessel is removed. The connected chain of spiral-wound-type membranes arranged in series is slid out of the pressure vessel. The inventive sealing body, inner/outer tubes, and membrane elements M1, M2 and M3 are then placed into the pressure vessel as described above.

EXAMPLES

A cylindrical test chamber (having an internal diameter of 8.274 inches) emulating the inner surface of a typical pressure vessel was utilized for pressure-testing sealing bodies. Each of two different sealing bodies was configured as shown for the sealing SB in FIG. 8. The only difference between the two sealing bodies was their diameter. Two types of o-rings (obtained from McMaster Carr and made of acrylonitrile butadiene rubber) were tested, each having a different hardness. In each case, the cup seal (obtained from Parker and made of cross-lined acrylonitrile butadiene rubber) was the same. In some cases, the pressure and/or time duration was varied. Using only human force, attempts were made to push the sealing body into the interior of the test chamber. The sealing body's ability to provide a gas-tight seal without leaks was then observed. The data is shown below in Table I.

TABLE I

Results of Pressure-Testing of Sealing Bodies

| Ex. | O-ring Shore hardness, type A (durometers) | Sealing body outer diameter (min-max) | Applied pressure (psig) | Time duration (hours) | O-ring gap (inches) | Observation |
|---|---|---|---|---|---|---|
| A | 90 | 8.023-8.027 | n/a | n/a | no gap | unable to slide sealing body without hy- |

TABLE I-continued

Results of Pressure-Testing of Sealing Bodies

| Ex. | O-ring Shore hardness, type A (durometers) | Sealing body outer diameter (min-max) | Applied pressure (psig) | Time duration (hours) | O-ring gap (inches) | Observation |
|---|---|---|---|---|---|---|
| B | 50 | 8.023-8.027 | 50 | 48 | no gap | draulic press leak-tight |
| C | 50 | 8.023-8.027 | 50 | 24 | 0.50 | leak-tight |
| D | 50 | 8.023-8.027 | 2 | 4 | 0.50 | Small leak present* |
| E | 50 | 8.023-8.027 | 2 | 24 | 0.50 | leak-tight |
| F | 50 | 8.023-8.027 | 2 | 72 | 0.125 | leak-tight |
| G | 50 | 7.994-7.997 | 2 | 24 | 0.50 | leak-tight |
| H | 50 | 7.994-7.997 | 2 | 24 | 0.125 | leak-tight |

*After detecting a small leak for example D, we removed and inspected the o-ring only to realize that it showed several cuts on its outside diameter. We determined that the cuts were caused by some welding burs in the pressure-testing chamber and thus discarded that result as poor data.

As seen in Example A of Table I, an o-ring having a Shore hardness (type A) of 90 durometers rendered the composite seal too stiff to allow it to be slid into the test chamber without the use of a hydraulic press. When we substituted an o-ring having a hardness of only 50 durometers, the sealing body could be slid into the test chamber without assistance whether there was no gap in the o-ring or a gap of 0.50 inches. As seen in Examples B and C, that combination of cup seal and 50-durometer o-ring was leak-tight for 24-48 hours when 50 psi was applied to the upstream side of the sealing body. As seen in Examples E and F, it also was leak-tight for 24-72 hours when only 2 psi was applied to the upstream side of the sealing body whether the gap in the o-ring was 0.125 inches or 0.50 inches.

We decided to see if the sealing body provided leak-tightness when an even greater gap was present between the outer diameter of the sealing body and the inner diameter of the test chamber. As seen in Examples G and H, it still remained leak-tight when only 2 psi was applied to the upstream end of the sealing body whether there was a gap in the o-ring of 0.125 inches or a gap of 0.50 inches.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A gas separation membrane module, comprising:
    a tubular pressure vessel having at least one feed gas inlet, at least one permeate gas outlet, and a non-permeate gas outlet;
    a plurality of membrane elements arranged in parallel within the pressure vessel, each of the membrane elements comprising a plurality of hollow fibers, an outer tube extending through the membrane elements that is substantially coaxial with an axis of the pressure vessel, and an inner tube that extends through an interior of the outer tube coaxial with or parallel to the axis of the pressure vessel, wherein:
        each of the plurality of outer tubes is connected to one another to form a single, integrated outer tube,
        each of the plurality of inner tubes is connected to one another to form a single, integrated inner tube,
        an annular space is defined by the inner surface of the single, integrated outer tube and an outer surface of the single, integrated inner tube,
        the single, integrated inner tube receives permeate gas flowing between the hollow fibers via perforations formed in the plurality of outer tubes,
        the annular space has a first end that is sealed and a second end that is open,
        each of the inner tubes fluidly communicates with bores of the fibers of an associated one of the plurality of membrane elements,
        the single, integrated inner tube has a first end that is open and which is adjacent the first sealed end of the annular space,
        the single, integrated inner tube also has a second end that is sealed and which is adjacent the second open end of the annular space;
    a permeate collection conduit fluidly communicating between the open end of the single, integrated inner tube and the permeate outlet; and
    at least one sealing body that is disposed around the outer tube at a downstream-most one of the plurality of spaced membrane elements, wherein:
        the sealing body is disposed at a position within the pressure vessel in between the downstream-most membrane element and the non-permeate gas outlet,
        the sealing body has a cylindrical cross-section adapted and configured to provide a gap in between a circumferential edge of the sealing body and an inner surface of the pressure vessel, the sealing body comprises first and second sealing plates where a planar face of the first sealing plate is flush with a planar face of the second sealing plate, and a composite seal that is disposed around a circumferential edge of the sealing body in a groove formed in between the first and second sealing plates and that is slidingly compressed against an inner surface of the pressure vessel to provide a seal between a side thereof that is exposed to feed gas and a side thereof that is exposed to non-permeate gas, the sealing body includes an opening, the single, integrated outer tube extending through the sealing body opening and terminating in the open end thereof so that non-permeate gas can flow from the annular space and out of the pressure vessel via the non-permeate outlet.

2. The gas separation membrane module of claim 1, wherein:

for each membrane element, each of the associated plurality of fibers has a first end that is open and is encased by a polymeric tubesheet and a second end that is sealed;

each of the tubesheets includes a plurality of channels that fluidly communicate with the associated first open fiber ends; and for each tubesheet, the associated plurality of channels fluidly communicate with an associated permeate gas passageway that comprises a pipe extending from an opening in a wall of the outer tube to an opening in a wall of the inner tube, the permeate gas passageways being leak-tight in that non-permeate gas in the outer tube is prevented from leaking into the inner tube at the passageways.

3. The gas separation membrane module of claim 1, wherein the composite seal comprises an o-ring nestled in a cup seal, the open end of the cup seal facing upstream.

4. The gas separation membrane module of claim 3, wherein the o-ring is continuous.

5. The gas separation membrane module of claim 3, wherein the o-ring is discontinuous so as to have a gap therein.

6. The gas separation membrane module of claim 5, wherein the o-ring has a Shore type-A hardness of less than 90 durometers.

7. The gas separation membrane module of claim 5, wherein the o-ring has a Shore type-A hardness of 50 durometers.

8. The gas separation membrane module of claim 5, wherein the gap of the o-ring ranges from 0.125-0.500 inches.

9. The gas separation membrane module of claim 3, wherein the o-ring has a Shore type-A hardness of less than 90 durometers.

10. The gas separation membrane module of claim 3, wherein the o-ring has a Shore type-A hardness of 50 durometers.

11. The gas separation membrane module of claim 1, wherein:

the plurality of membrane elements comprises an upstream membrane element, a downstream membrane element, and at least one intermediate membrane element positioned between the upstream and downstream membrane elements; and the permeate gas outlet is disposed at a position adjacent one end of the pressure vessel and the non-permeate gas outlet is disposed at a position adjacent an opposite end of the pressure vessel.

12. The gas separation membrane module of claim 1, wherein:

the plurality of membrane elements comprises a right-hand side group of membrane elements and a left-hand side group of membrane elements;

the right-hand side group of membrane elements comprises an upstream membrane element, a downstream membrane element, and at least one intermediate membrane element positioned between the upstream and downstream membrane elements;

the left-hand side group of membrane elements comprises an upstream membrane element, a downstream membrane element, and at least one intermediate membrane element positioned between the upstream and downstream membrane elements;

a single, integrated outer tube is formed by connection of each of the plurality of outer tubes of the right-hand side group of membrane elements, connection of each of the plurality of outer tubes of the left-hand side group of membrane elements, and connection of the connected right-hand side group of membrane elements to the connected left-hand side group of membrane elements;

a single, integrated inner tube is formed by connection of each of the plurality of inner tubes of the right-hand side group of membrane elements, connection of each of the plurality of inner tubes of the left-hand side group of membrane elements, and connection of the connected right-hand side group of membrane elements to the connected left-hand side group of membrane elements;

the at least one sealing body comprises a right-hand side sealing body and a left-hand side sealing body, the right-hand side sealing element being disposed around the outer tube at the downstream element of the right-hand side group of membrane elements, the left-hand side sealing element being disposed around the outer tube at the downstream element of the left-hand side group of membrane elements;

the pressure vessel has opposite ends;

the at least one feed gas inlet comprises two feed gas inlets each of which is disposed adjacent to one of the opposite ends of the pressure vessel;

the at least one permeate gas outlet comprises two permeate gas outlets each of which is disposed adjacent to one of the opposite ends of the pressure vessel; and the non-permeate gas outlet is disposed between the left-hand and right-hand side sealing bodies.

* * * * *